United States Patent
Langsweirdt et al.

(10) Patent No.: US 8,135,352 B2
(45) Date of Patent: Mar. 13, 2012

(54) TELECOMMUNICATION ENCLOSURE MONITORING SYSTEM

(75) Inventors: Ronald L. Langsweirdt, Austin, TX (US); Herbert Anders, Dortmund (DE); Bernd Lindenbeck, Wuppertal (DE); Bernhard Schneider, Herne (DE); Joerg Hahn, Neuss (DE); Marian Starosta, Neuss (DE); Manuel Steinbrink, Neuss (DE); Manfred Stieglitz, Neuss (DE)

(73) Assignee: 3M Innovative Properties Company, St. Paul, MN (US)

( * ) Notice: Subject to any disclaimer, the term of this patent is extended or adjusted under 35 U.S.C. 154(b) by 752 days.

(21) Appl. No.: 12/299,140

(22) PCT Filed: May 2, 2007

(86) PCT No.: PCT/US2007/067974
§ 371 (c)(1),
(2), (4) Date: Oct. 31, 2008

(87) PCT Pub. No.: WO2007/131006
PCT Pub. Date: Nov. 15, 2007

(65) Prior Publication Data
US 2009/0096603 A1    Apr. 16, 2009

Related U.S. Application Data

(60) Provisional application No. 60/746,241, filed on May 2, 2006.

(51) Int. Cl.
*H04B 17/00* (2006.01)
(52) U.S. Cl. ............... 455/67.11; 455/401; 455/405; 455/557

(58) Field of Classification Search .......... 455/403, 455/404.1, 404.2, 405, 414.2, 456.3, 41.2, 455/41.1, 67.11, 557, 575.5, 575.8; 359/872; 340/539.1, 531, 870.01
See application file for complete search history.

(56) References Cited

U.S. PATENT DOCUMENTS

| | | | |
|---|---|---|---|
| 4,394,679 A | 7/1983 | Hawrylo |
| 5,059,746 A | 10/1991 | Hayes et al. |
| 5,198,887 A | 3/1993 | Brown |
| 6,061,747 A | 5/2000 | Ducaroir et al. |
| 6,298,699 B1 | 10/2001 | Gartner et al. |

(Continued)

FOREIGN PATENT DOCUMENTS
EP      0 557 861 A2     9/1993

OTHER PUBLICATIONS

Chung, Wan-Young and Oh, Sung-Ju, "Remote monitoring system with wireless sensors module for room environment"; *Sensors and Actuators B* (2006); Elsevier B.V.; vol. 113, No. 1; pp. 64-70.

*Primary Examiner* — John J Lee
(74) *Attorney, Agent, or Firm* — Janet A. Kling

(57) ABSTRACT

A remote monitoring system for telecommunication enclosures includes a low profile or flush mounted sealed transceiver or antenna unit, an electronic module inside of the enclosure electrically connected to the transceiver and a communication device to send signals to the electronic module through the transceiver. The sealed housing generally comprises a portion extending through the exterior surface of the enclosure. In some embodiments, the transceiver may include a radio frequency antenna, a photoelectric cell, a light sensor or an infrared sensor, and the communication device may be a handheld device, a transponder, or a networked computer.

18 Claims, 6 Drawing Sheets

U.S. PATENT DOCUMENTS

| | | |
|---|---|---|
| 6,522,737 B1 | 2/2003 | Bartolutti et al. |
| 6,822,161 B2 | 11/2004 | Komatsu et al. |
| 6,844,816 B1 | 1/2005 | Melton et al. |
| 2002/0013679 A1* | 1/2002 | Petite .......................... 702/188 |
| 2002/0036339 A1 | 3/2002 | Taguchi et al. |
| 2003/0001896 A1* | 1/2003 | Johnson et al. ............... 345/771 |
| 2004/0041705 A1 | 3/2004 | Auerbach et al. |
| 2004/0246607 A1* | 12/2004 | Watson et al. ................ 359/872 |
| 2006/0007899 A1 | 1/2006 | White |
| 2009/0283320 A1 | 11/2009 | Twitchell, Jr. et al. |

\* cited by examiner

TELECOMMUNICATION ENCLOSURE MONITORING SYSTEM

CROSS REFERENCE TO RELATED APPLICATION

This application claims the benefit of U.S. Provisional Application No. 60/746,241, filed May 2, 2006, the disclosure of which is incorporated by reference herein in its entirety.

BACKGROUND

In various technical fields, a variety of objects or installations are accommodated in rooms or cabinets that may be closed with a door. It is often desirable to control access to such rooms or cabinets, and in such situations it may prove insufficient to lock the door with a mechanical lock. It is possible, for example, for a person not authorized to access the room or cabinet to gain possession of a key to the mechanical lock. For this reason electronic locks are sometimes used, since unauthorized access can be prevented more easily, or at least be monitored to know who and when a protected area is accessed. An electronic lock can, for example, be connected to a centralized security system and there monitored for unauthorized access.

In the particular field of telecommunications, numerous customers are connected with the switch of a telecommunications company via telecommunications lines. These customers are also sometimes referred to as subscribers. The switch is also often called an exchange, or "PBX" or "DSLAM" (a central office exchange operated by the telecommunications company). Between the subscriber and the switch, sections of telecommunications lines are connected with telecommunications modules. Telecommunications modules establish an electrical connection between a first wire attached to the telecommunications module at a first side and a second wire attached to the telecommunications module at a second side. The wires of one side can also be called incoming wires and the wires of the other side can be called outgoing wires. Plural telecommunications modules can be put together at a distribution point, including on a main distribution frame, an intermediate distribution frame, an outside cabinet or a distribution point located, for example, in an office building or on a particular floor of an office building. To allow flexibility in wiring, some telecommunications lines are connected with first telecommunications modules in a manner to constitute a permanent connection. Such a distribution point can be accommodated in a designated room or cabinet located either inside or outside a building and it may be protected by an electronic lock substantially as described above. Moreover, distribution points can be accommodated in manholes, i.e., underground holes that can be adapted to allow an individual to climb into the hole and provided with a cover that may include an electronic lock. The electronic lock may include an antenna, a transponder or a similar electric or electronic component attached to a door or other outside surface of the protected room or cabinet.

In applications where locks (whether electronic or mechanical) are employed, including in the various telecommunications applications described above, there is also a need to provide remote monitoring of secure cabinets, vaults or other spaces containing valuable equipment or other contents. There is also a desire to remotely receive or send information electronically stored inside a cabinet, vault or other such space. For example, inside a telecommunications cabinet, there may be a desire to remotely monitor the environmental conditions (temperature, humidity, lighting, spatial orientation, etc.) of the electronic components or equipment housed within it. There may also be a desire to remotely read or record the inventory, maintenance history, serial number, subscriber list and other such information associated with the stored contents.

SUMMARY OF THE INVENTION

In one aspect, the invention provides a remote monitoring system for a telecommunication enclosure such as a cabinet, underground vault, equipment room or other enclosed space. The system comprises a transceiver located within a sealed housing mounted on an exterior surface of the enclosure, an electronic module inside of the enclosure that is electrically connected to the transceiver and a remote communication device to send signals to the electronic module through the transceiver. The sealed housing generally comprises a portion extending through the exterior surface of the enclosure. In some embodiments, the transceiver may include a radio frequency antenna, a photoelectric cell, a light sensor or an infrared sensor, and the communication device may be a handheld device, a transponder, or a networked computer. The electronic module may include an electronic lock, a data storage device, a memory device, telecommunication equipment (i.e. a remote switching module, DSLAM, Digital Subscriber Loop Access Multiplexers, or a Video Ready Access Device, etc.), an electronic alarm, a control unit, or an electronic sensor.

In some embodiments of the current invention, the enclosure can have electromagnetic interference protection or shielding.

In some embodiments, the monitoring system may be used to query local environmental conditions within the enclosure or information stored in the electronic module in the enclosure and to send the information back to the remote communication device outside of the enclosure. Queried information may include an inventory of the enclosure's contents, an access log, installation and maintenance records of equipment in the enclosure, a list of customers and services supplied by the equipment in the enclosure, or alarm information.

In an alternate embodiment, the monitoring system may be used to instruct the test access matrix device or the electronic sensors to perform diagnostic tests and to send the test results back to the remote communications device. The diagnostic tests include querying data transmission rates of the lines in the enclosure, identification and location of bad lines or equipment, or monitoring of performance parameters of electronic equipment in the enclosure.

In an alternate embodiment, the invention provides a method of querying a closed telecommunications enclosure. A signal may be sent from a remote communication device to an electronic module within the enclosure through a transceiver located in a sealed housing on an external surface of the enclosure. The signal may include a software upload or direction to perform a task. The task may include performing a data query of information within the electronic module, providing emergency power to open an electronic lock or instructing the electronic module to perform an action. The actions may include directing an electronic sensor to take a reading, having the test matrix initiate a test protocol, shutting off an electronic alarm, or opening an electronic door lock. The electronic module performs the requested task and sends an acknowledgement signal or a report back to the communication device via the transceiver.

BRIEF DESCRIPTION OF THE DRAWINGS

The invention will be described hereinafter in part by reference to non-limiting examples thereof and with reference to the drawings, in which.

DETAILED DESCRIPTION OF PREFERRED EMBODIMENTS

Figure 6:
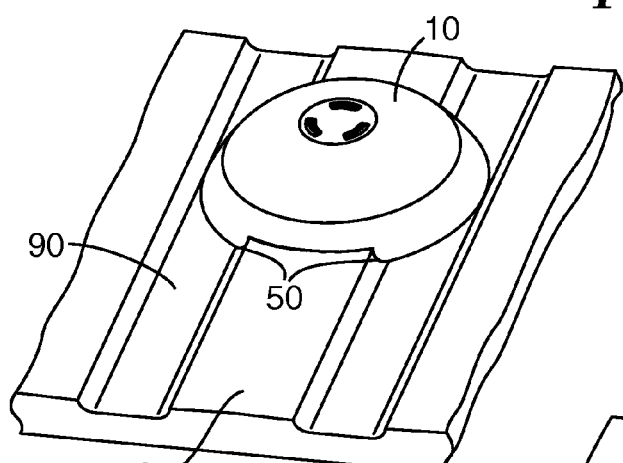
FIG. 6 shows a perspective view of a housing according to an embodiment of the present invention in a mounted state.
Figure 7:
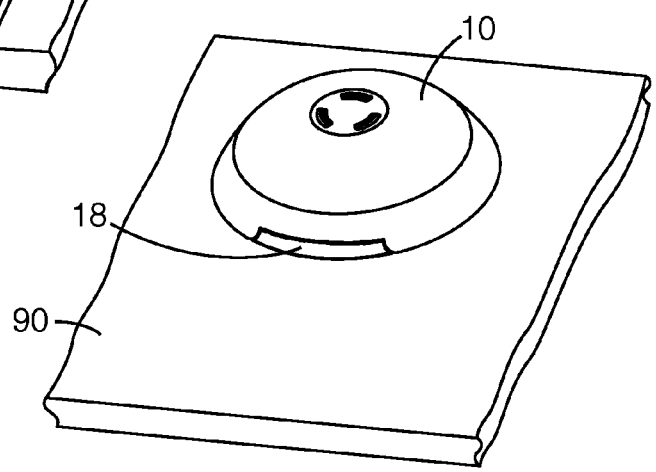
FIG. 7 shows a perspective view of a housing unit of one of FIG. 1-3 in the mounted state.
Figure 8:
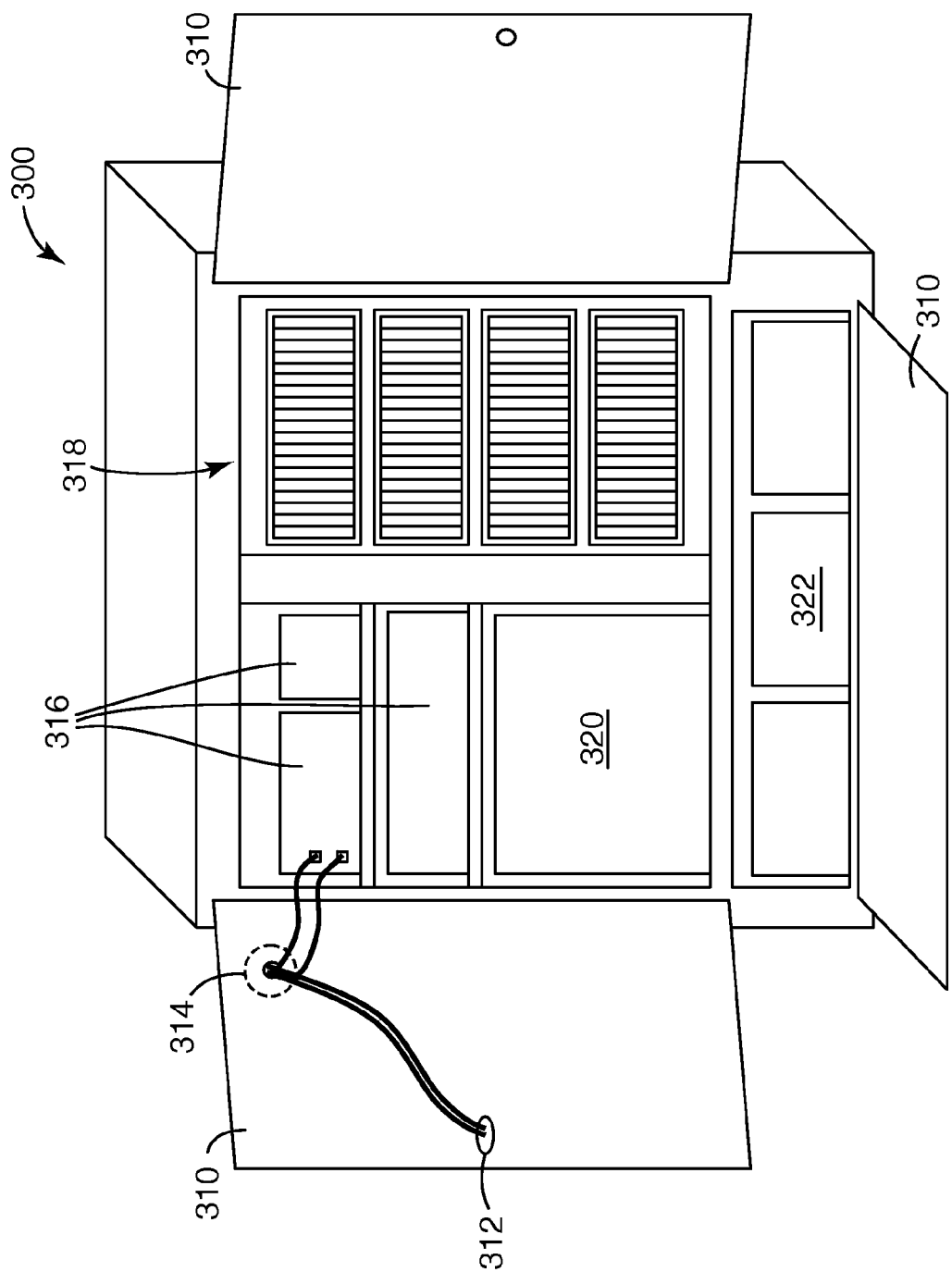
FIG. 8 shows a perspective view of a telecommunications cabinet employing an electronic lock according to one aspect of the invention.
Figure 9:
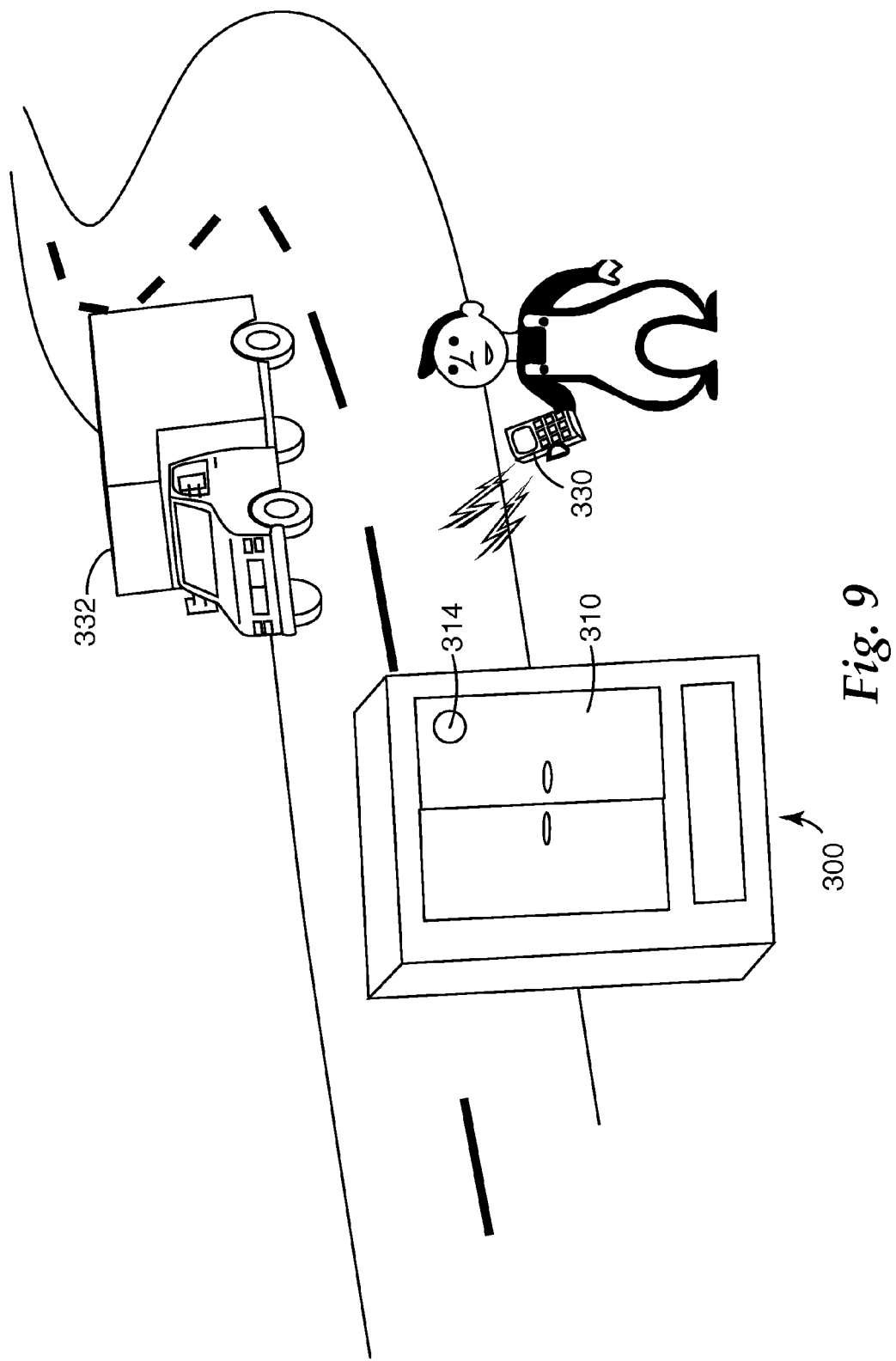
FIG. 9 depicts one embodiment of a remote access monitoring application according to the invention.
Figure 10:
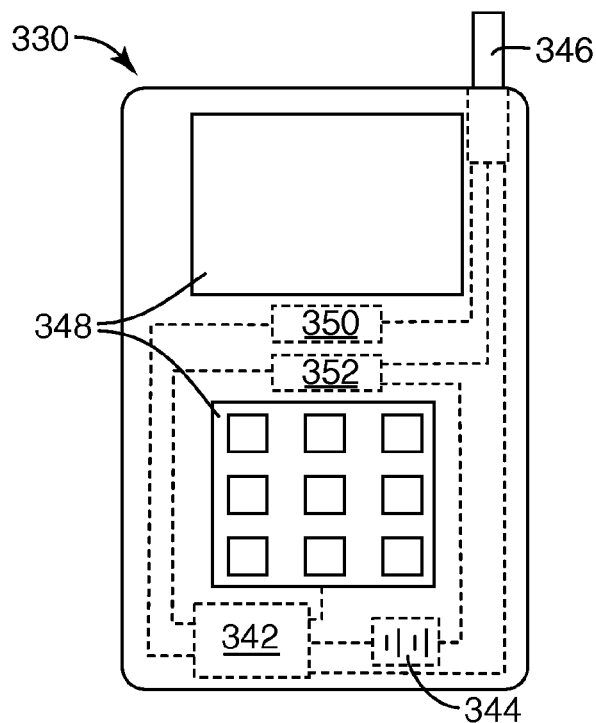
FIG. 10 depicts one embodiment of a remote communication device according to one aspect of the invention.
Figure 11:
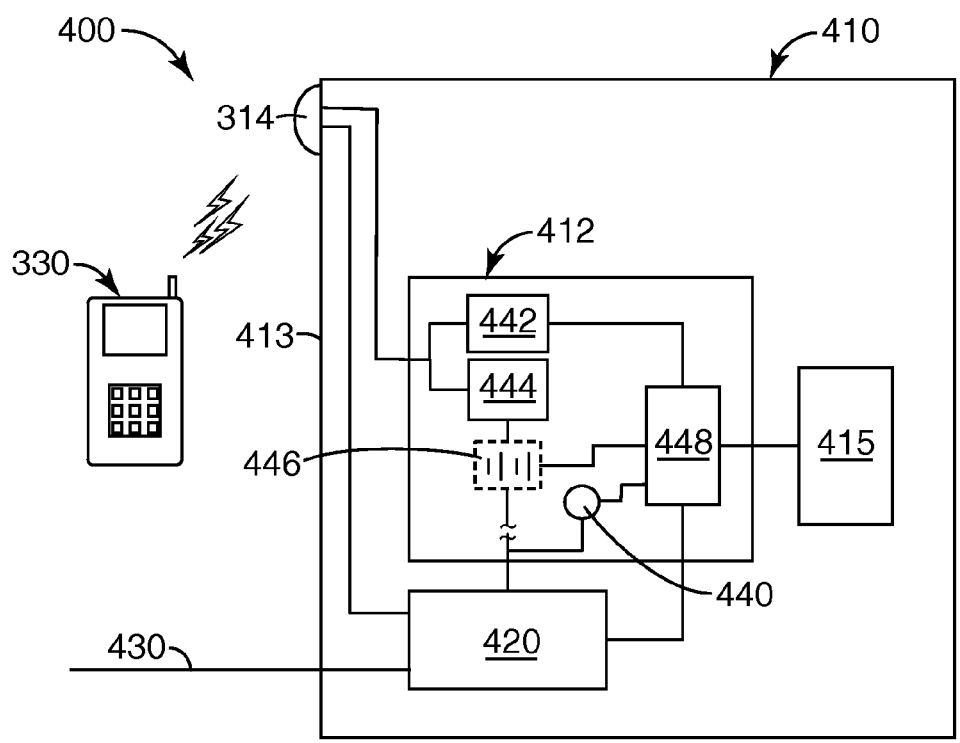
FIG. 11 depicts an alternative embodiment of a remote access monitoring application according to the invention.

A remote monitoring system for telecommunication enclosures includes a low profile or flush mounted sealed transceiver or antenna unit and is described herein. FIGS. 1-7 particularly show exemplary embodiments of a transceiver housing unit and its attachment components. FIG. 8 shows an exemplary telecommunication enclosure that can utilize the sealed transceiver unit. FIGS. 9-11 show exemplary monitoring systems. These figures are each described in particularity further below.

In a preferred aspect, the remote monitoring system described herein can allow a craftsman to perform status checks, gather information, initiate test protocols, download software to electronic equipment or modules within a telecommunication enclosure without the need for a direct hard wire connection or without having to open the enclosure to gain physical access to the interior of the enclosure. A remote communication device can send a signal to a transceiver located on the external surface of the enclosure. The transceiver may be electrically coupled to an electronic module inside of the enclosure. In some embodiments, the transceiver may include a radio frequency antenna, a photoelectric cell, a light sensor or an infrared sensor. A signal from the communication device may be received by the transceiver and communicated to the electronic module. The electronic module may include a centralized control unit, an electronic lock, a data storage device, a memory device, telecommunication equipment, a test access matrix, electronic alarms, and an electronic sensor(s).

The signal may initiate an action such as opening an electronic lock, running a test protocol using the test access matrix, or having an electronic sensor or meteorological equipment take a reading of environmental conditions. Alternatively, the signal may query an electronic module such as a data storage device for information. The electronic module within the enclosure may send the requested information, test data, sensor reading or a confirmation that a requested action has been completed back through the transceiver to be received by the communication device. Alternatively, the craftsman can redirect the requested information to a centralized monitoring location such as a central office or regional monitoring station using an installed network management and/or security system or can communicate directly with the central office or regional monitoring station.

Regarding the exemplary transceiver/antenna housing units, the housings described herein are generally sealed and accommodate at least one electric or electronic component. The housing may include one or more housing parts such as a cover and base plate. The housing parts may be made of a moldable plastic material, and in at least some embodiments at least a portion of the housing parts is made of a translucent plastic material. The material of the housing parts may be resistant against aggressive substances. The housing is generally sealed to protect the electric or electronic components contained within it. Such sealing can provide protection against a water spray (corresponding to IP 54 protection) or against water supplied by a hose (corresponding to IP 65 protection). By using a seal of appropriate material, such as a graphite-containing material, a seal may additionally be provided against aggressive substances like gasoline or oil which may be present in an outside environment where the housing may reside in use when, for example, it is mounted to an outdoor cabinet.

The electric or electronic components contained within the housing can be active, passive, or both active and passive. A transceiver or an antenna, which may be connected to an electronic lock or other electronic module within the cabinet, can be contained inside the housing. The transceiver or antenna may be designed such that it can receive signals from a remote communication device as well as transmit signals to the communication device.

Thus, the transceiver housing unit makes it possible to mount an antenna on the outside surface of a telecommunication enclosure such as a cabinet, an installation/equipment room, a man hole, an underground vault, a closure, a terminal, a distribution hub or any other space in which electronic components or assemblies are securely stored, while allowing the antenna to be electrically connected to an electronic module inside the enclosure. Alternatively, the enclosure may be a storage location containing a simple memory device for inventory management.

The housings may be retrofitted to existing cabinets, installation rooms or other infrastructure elements described above, including in the doors of pre-existing cabinets.

The transceiver housings may also be mounted to a desired object on-site. As will be described in more detail below, a single hole can be made through the mounting surface to allow the housing to be mounted. The hole may be made by known processes such as by punching, drilling and the like. It may be advantageous to drill circular holes since they are easily made. After drilling the hole, the prepared housing from which one or more cables connected with the components contained within the housing may extend can be mounted by inserting one or more cables and a portion of the housing through the hole and appropriately fixing the housing.

The housing generally has a portion extending through the mounting surface. This portion may have a substantially circular cross-section (or in some embodiments preferably a cross-sectional racetrack geometry) and may include a thread adapted to interact with a nut. The nut can be tightened to attach the housing by clamping the mounting surface between the housing and the nut. The portion extending through the mounting surface may include a guide and/or a seal that may surround one or more cables leading to the area inside or behind the mounting surface.

The housing also generally has a rotation prevention mechanism that can hinder or stop rotation of the housing relative to the mounting surface. This rotation prevention mechanism, or rotation preventor, can be any contour, structure, separate element or combination of elements capable of hindering or stopping rotation of the housing relative to the mounting surface. Some examples are given below. The rotation prevention mechanism may be adapted to completely prevent rotation of the housing relative to the mounting surface, or it can be adapted to sufficiently hinder rotation or stop rotation within a certain desired range with regard to the rotation angle. The rotation prevention mechanism provides the advantage of enhancing the long-term reliability of the housing and the electric or electronic components contained within it. For example, when one or more cables extending from the housing are connected with an electronic lock, the rotation prevention mechanism hinders or stops the housing and, as a consequence, prevents the cables from being twisted, a condition that can harm or destroy the electrical connections. Thus, a well-protected and reliable attachment of one or more electric or electronic components to a mounting surface may be achieved by the housings. The rotation preventor may also comprise means for preventing rotation of the housing relative to the mounting surface. These means may particularly be provided on the mounting surface, on the housing and/or between the housing and the mounting surface without extending through the mounting surface. When a housing includes only a single portion extending through the mounting surface, rotation generally cannot be effectively prevented by interaction between this portion and the edges of a hole through which the portion extends. The inclusion of a rotation prevention mechanism has been shown to preclude rotation of the housing relative to the mounting surface.

The rotation prevention mechanism may be a friction enhancing element, allowing the housing to be mounted to a substantially flat mounting surface with the friction enhancing element providing sufficient friction between the housing and the mounting surface to prevent rotation. The housing may have a single portion extending through a hole in the mounting surface which may be larger in diameter than the portion and/or the portion may be circular in cross-section so that rotation cannot be prevented by interaction between the portion extending through the mounting surface and the edges of the hole. Surprisingly, it has been found that a friction enhancing element, which may be clamped between the housing and the mounting surface provides sufficient rotation resistance on of the housing relative to the mounting surface through a frictional contact force. In this regards, an O-ring can be employed as the friction enhancing element, as an O-ring is a standard and inexpensive piece and allows the described effects to be achieved.

The rotation prevention mechanism may also comprise or contain at least one step or groove formed in the housing that corresponds to a similar feature in the mounting surface. As will be described in more detail below, the housing may be attached to a mounting surface that has one or more raised strips formed on it. Such a raised strip may have flanks that interact with at least one step formed on the housing to prevent rotation. At least one groove may also be provided to accommodate the raised strip and prevent rotation of the housing relative to the mounting surface. Alternatively, the housing may be designed such that it is mountable on mounting surfaces having other surface features such as channels, v-shaped ridges, and the like.

The housings can be employed in connection with an electronic lock, which implies that the electronic component accommodated in the housing may include an antenna adapted to receive authorization information from a transponder or similar device. Thus, in one use, the housing may be used in a security system to prevent unauthorized access to rooms, cabinets or similar areas.

It may also prove advantageous that a person receive a confirmation signal after sending the authorization information to the electronic component such as an antenna. The confirmation signal may comprise a signal sent from an electronic module in the telecommunications enclosure to a remote communication device. Alternatively, the confirmation signal may be an optical signal, acoustic signal, or both. Such a signal may confirm authorization by sending out a light signal and/or sending out a light signal having a different color than in a situation when authorization is denied. This approach can be realized by providing at least one optical signaling device, such as an LED, in the housing in a manner that is externally visible. For example, at least a portion of the housing may be made sufficiently translucent to allow an optical signaling device contained inside the housing to be externally viewable. The housing may be made of two or more different materials, such as from a first a translucent material and a second opaque material. In the manufacturing process of the housing the portion of the housing made of a first material can be produced first and can thereafter be combined with the second material by injection molding "around" the first material. The portion made of the first, opaque material may have an opening that is subsequently filled with a translucent material to provide a window or viewing hole to allow an optical signaling device to be viewed from outside the housing.

Alternatively, the antenna may include a send cell to communicate the confirmation to a remote device such as (e.g. programmable remote device similar to the IR interface used to communicate with laptop computers and other handheld mobile devices).

The housings may additionally provide a substantially shock-proof accommodation of the one or more electronic or electric components by including at least one damper. It may, furthermore, provide enhanced protection against tampering or any attempts to destroy or remove the housing from the mounting surface. The housing may have a low-profile shape that substantially avoids corners or edges that could be used to engage a tool if an attempt to remove or destroy the housing is made. Thus, the housing may preferably have an at least partially spherical, dome, or bowl shape.

The housing may include at least one base plate and at least one cover. The cover may be attachable to the base plate in an attachment direction. This construction of the housing can be particularly useful for assembling the housing and accommodating the electronic or electric components by mounting the components directly onto the base plate and closing the housing by attaching the cover thereafter.

Additional rotation protection between cover and base plate may be provided by attaching the cover to the base plate in a non-rotatable manner. Moreover, when the position of an optical signaling device, such as an LED, relative to the base plate is fixed, the non-rotatable attachment of the cover to the base plate can ensure that the optical signaling device is reliably visible through a translucent portion in the cover and that the cover is securely attached to the base.

It may be advantageous to fix the base plate and the cover to each other by plastic deformation of at least one portion, such as at least one protrusion of the base plate and/or the cover. The other housing part, i.e., the cover or the base plate, may include one or more through holes or recesses into which the portion that is to be deformed is inserted. The deformation may be carried out by ultrasonic welding or an application of heat and/or pressure and may be considered a riveting process that deforms the mentioned portions to prevent these from leaving the through holes or recesses. As a result, the cover and the base plate can be attached to one another.

When the cover is attached to the base plate in an attachment direction, it may be advantageous to provide a seal, such as an O-ring, between the base plate and the cover by a force acting in a direction different from the attachment direction. In this manner, the force generated by the seal in reaction to the holding force does not act in the attachment direction and does not, therefore, endanger the reliability of the attachment of the cover to the base plate.

It may also be desired to provide electrostatic discharge ("ESD") protection to prevent unintended damage to the electronic components contained within the housing. This protection may be accomplished when the cover and the base plate are made of an isolating material to provide such protection. A sealing element such as an O-ring made of silicone may also be used for this purpose. Alternatively, when a more conventional sealing element such as a graphite containing O-ring is used a maze is formed between the base plate and the cover to provide isolation between the interior and the exterior of the housing. Such a maze may be formed by one or more ridges, webs or projections. The maze increases the distance a spark produced outside the housing would have to travel to reach the inside of the housing. An alternative embodiment may comprise a different kind of O-ring, e.g., an O-ring made of Silicone or unfilled rubber.

The sealed antenna/transceiver housing unit may be provided as a kit of parts that can be used to retrofit existing cabinets or installation rooms, in particular cabinet or room doors. The kit of parts may be mounted to the desired object easily on-site in the field. The kits may include at least one housing and at least one spacer. The spacer may be used to make a housing that is compatible with a flat mounting surface by placing the spacer in a groove formed in the housing where the groove may be adapted to accommodate the raised strip of the mounting surface. The spacer may also be used as a drilling template to define a proper location for drilling a hole through which a portion of the housing can extend. The spacer may have at least one hole denoting a drilling location for drilling a hole for allowing the portion of the housing to pass through.

To render the spacer compatible with different mounting conditions, the spacer may have at least one portion defining the above-mentioned hole, the portion being removable from the spacer. This way, in addition to its use as a drilling template the spacer can be use to mount the housing to a flat surface when the portion including the hole is removed so that the portion of the housing extending through the mounting surface would also extend through the hole of the spacer.

It may be furthermore advantageous when the housing has a groove adapted to accommodate the spacer in a manner to locate outer contours of the spacer substantially flush with outer contours of the housing. In this case, the combination of the housing and the spacer substantially avoids any steps, gaps, edges or corners, which could be used to engage a tool.

The sealed transceiver housing unit may be provided as a kit of parts including at least one housing and a drilling template. As described above with regard to the spacer, the drilling template may have at least one hole denoting a drilling location for drilling a hole for allowing the portion of the housing to pass through. With such a kit of parts, reliable mounting of the housing can be achieved.

The kit of parts may further include at least one fastener adapted to cooperate with the portion extending through the mounting surface to secure the housing. In particular, the mounting surface can be clamped between the housing and a fastener (e.g., a nut) by tightening the fastener.

Whereas the housing or the kit of parts described herein may be used to retrofit a cabinet or an installation room, for example by retrofitting a door, an aspect of the invention also provides a combination of the housing or kit and a door, preferably of a cabinet or an installation room. With this combination, a door of an installation room or a cabinet can be provided with a well-protected electronic or electric module on the outside, for example, in the case where the electronic or electric module includes an electronic lock.

Tampering with or any other attempts to remove or destroy the housing from the mounting surface can be efficiently prevented when the housings of the inventive system are installed flush with the mounting surface around the perimeter of the housing.

The transceiver housing unit finally provides a use of a friction enhancing element, such as an O-ring, for mounting a housing to a mounting surface in a non-rotatable manner. In this context, the friction enhancing element prevents rotation of the housing relative to the mounting surface by clamping the friction enhancing element by a force increasing the friction sufficiently to prevent rotation.

The housings and antenna assemblies including the housing unit may be employed in any application where mechanical or electronic locks are employed to provide a system that allows for remote monitoring of secure cabinets, vaults or others spaces containing valuable equipment or other contents. When coupled with an electronic lock, such as was described previously, an antenna (e.g., a radio antenna) may be incorporated in the housing that can communicate with an external communication device or receiver (including a handheld device, a transponder, a networked computer, etc.) to provide alarm information and/or can record a log of access to the closed space to which it is attached.

Such antenna assemblies can also be employed in connection with an electronically stored equipment inventory or data storage device. In such applications, the antenna can be connected to a memory device that records any variety of information related to the contents of the enclosure or closed space to which it is attached. For example, such information may include an inventory of contents (including, e.g., serial numbers, model numbers, etc.), an installation and/or maintenance record of equipment, a list or other inventory of subscribers or customers with which the equipment is associated or the like. The ability to gather information in this manner can have particular advantage in the telecommunications industry, where a craftsman or technician can access key information related to the content, performance and maintenance history of the equipment contained in a closed and/or secured telecommunications enclosure or cabinet remotely and without the need to open the cabinet first, saving time, money and expense. For example, if the cabinet inventory indicates that there is insufficient cross-connect modules in the cabinet to hook-up new subscribers, the technician can compare that information to the inventory of cross-connect modules he or she has on hand and plan an installation visit accordingly.

The antenna assemblies of the invention can also be used to monitor the environmental conditions and/or the performance of equipment housed in a closed cabinet or space. For example, the antenna may transmit information from sensors located on or inside the cabinet or space related to the temperature, humidity, lighting, special orientation or other environmental conditions. Alternatively, a remote communication device may be used to send a signal to the sensors via the antenna directing the sensors to take a reading and to transmit the results of the reading back to the technician having the communication device. Such a system may also transmit information related to equipment performance. In a particular telecommunications application, the antenna may be electrically connected to the telecommunications equipment within the cabinet or space. The craftsman may send a query or receive information related to line speeds, battery life, number of lines in use or other performance information of the telecommunication equipment in the enclosure. The antenna may also be connected to a test access matrix ("TAM") to allow for monitoring and diagnostic testing of telecommunications equipment through the remote communication device. The diagnostic tests include querying data transmission rates or line resistances of the telecommunication lines in the enclosure, identification and location bad lines or equipment, or monitoring of performance parameters of electronic equipment in the enclosure.

The method by which the antenna assemblies may be used to establish a one-way or two-way communication between one or more remote transmitters/receivers and a data processing function housed within the cabinet or enclosed space can proceed according to any customary system architecture. By way of illustration for a particular application to the telecommunications industry, a system can be constructed to allow a technician to send a signal to the antenna from a handheld wireless device. The signal can contain a data query or direction and be transmitted directly to a control unit via the antenna assembly and there processed. If the signal is a data query, the information can be retrieved from a memory device and sent back to the technician via the antenna and handheld communication device. If the signal is a direction received by a control unit, the control unit can send a signal to the applicable piece of equipment for it to carry out the command (e.g., open an electronic lock, have a sensor execute a reading and return information to the technician, deactivate an alarm, etc.).

Figure 1:
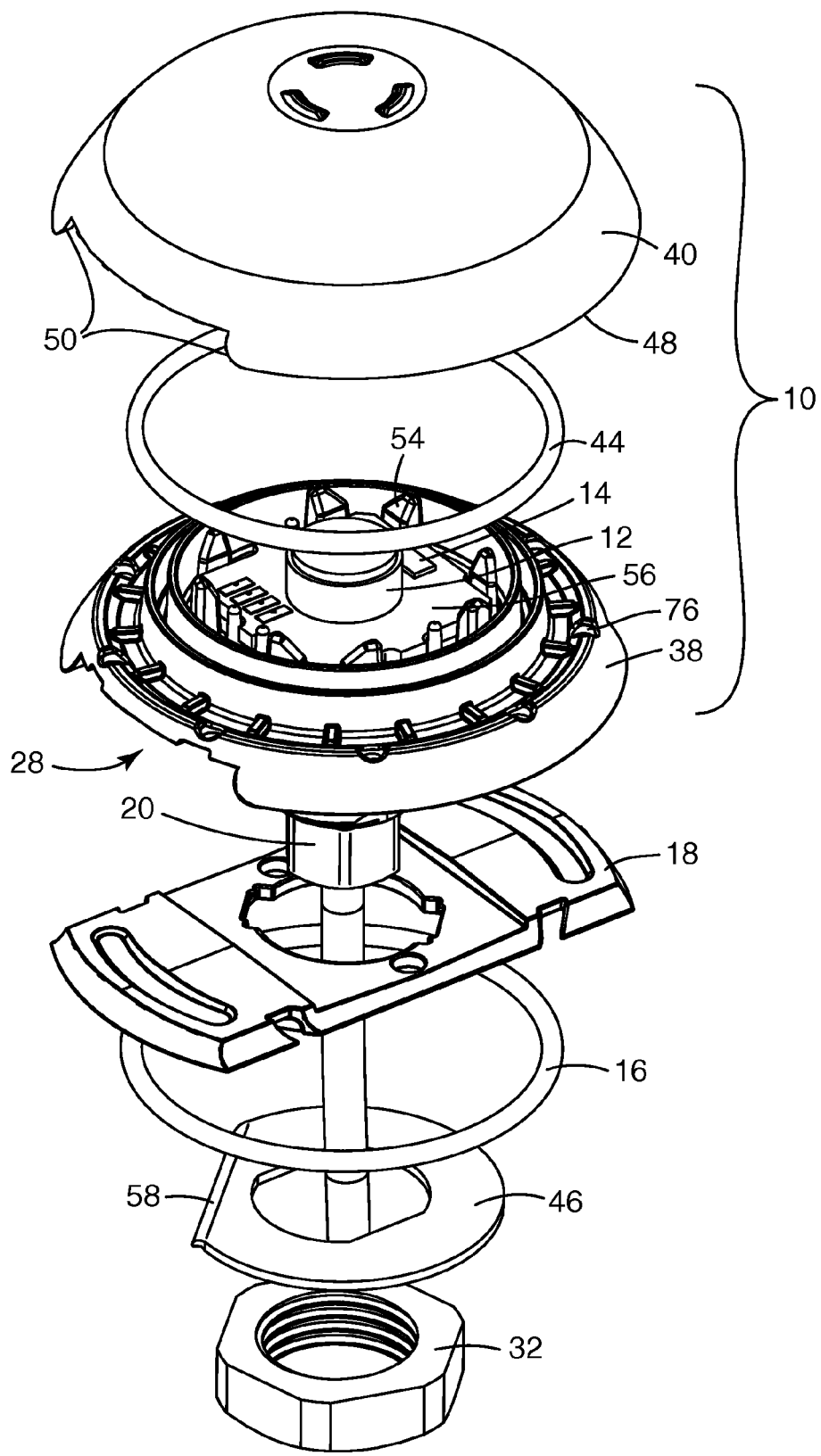
FIG. 1 shows an exploded view of a housing according to an embodiment of the invention.

Turning now to FIG. 1, which is an exploded view of a sealed transceiver housing unit comprising of a sealed housing 10 having a base plate 38 and a cover 40. As will additionally be apparent from FIGS. 2 and 3, the cover 40 may be dome-shaped and may lack any edges or corners. This lack of an exposed edge structure may be advantageous for preventing an engagement by a suitable tool, which may be a heavy-duty tool that could be used to destroy or remove the cover 40 and/or the complete housing 10 by violence from an exterior mounting surface 90 of a telecommunication enclosure. In particular, the lower edge 48 of the cover 40 is adapted to be flush with the mounting surface 90 as shown in FIGS. 6 and 7. In one embodiment as shown in FIG. 1, the lower edge 48 of the cover 40 may be provided with two steps 50 which may correspond to a groove (not visible in FIG. 1) formed on that side of the base plate 38 which is adapted to face and mate with a corresponding feature of the mounting surface 90. As can be seen in FIG. 6, the groove may be adapted to receive a raised strip 52 formed on the mounting surface 90. Thus, the groove may serve as a rotation preventor hindering or halting rotation of the housing 10 relative to the mounting surface 90. In an alternative embodiment the lower edge 48 may be unbroken such that it may be mounted to a flat mounting surface using a friction enhancing element without the need for a spacer. It is additionally within the scope of this invention to provide an alternately shaped spacer which would allow the use of a housing having an unbroken edge to adapt to a cover having an unbroken edge to be mounted on a non-flat mounting surface. In this instance the friction enhancing element would be located between the spacer and the housing.

The transceiver housing unit may include a spacer 18 adapted to fit into groove 28 formed in the base plate 38. The use of this spacer 18 renders the embodiment of FIG. 1 compatible also with flat mounting surfaces 90 as shown in FIG. 7 (i.e., where the mounting surface lacks one or more raised strips 52 as shown in FIG. 6). In both situations, shown in FIGS. 6 and 7 (i.e., the housing being mounted to a mounting surface 90 having one or more raised strips 52 without the spacer 18 and mounted to a flat mounting surface 90 together with spacer 18) the edges of the cover 40 and/or the spacer 18 are flush with the mounting surface 90. This structure may provide the advantage that also in the mounted state, there are substantially no gaps and/or free edges, which could be used to engage a suitable tool therewith to attempt to remove or destroy the housing by violence from the mounting surface 90.

As can be seen in FIG. 1, the base plate 38 may include various pins 54 which may serve at least one of the following purposes. Firstly, internal twist protection can be provided such that rotation of the cover 40 relative to the base plate 38 is prevented by engaging one or more detents, tabs or similar structures provided on the cover (not visible in FIG. 1) with one or more pins 54 provided on the base plate. Secondly, one or more pins 54 may provide coding for one or more printed circuit boards 56 which may be inserted in the interior of the base plate 38. In other words, one or more edges of the printed circuit board can have a specific contour (i.e. a combination of recesses, projections, steps or the like which need to correspond to one or more pins 54 provided in the base plate 38 to be able to insert the printed circuit board 56 appropriately). In this context, the printed circuit board 56 may be substantially rectangular or square. Those pins 54, which are used for providing the above-described twist protection, may be present near the corners of the printed circuit board, and those pins 54, which provide the above-described coding, may be present along one or more edges of the printed circuit board.

As can be seen in FIG. 1, the printed circuit board 56 may carry one or more electronic or electric devices, such as a transceiver or an antenna 12 and/or an LED 14. The antenna 12 may be used as a component of an electronic lock or security monitoring system. For example, an electronic lock (not shown in the figures) may be configured to receive access information sent to the antenna 12 from outside the housing 10 by a suitable transponder or a similar device. The suitable access information may be used in the electronic lock to unlock and/or allow the unlocking of a mechanical lock. Moreover, the access information may be sent to a central security system to collect data about any accesses that have occurred, and to check if they were authorized. Alternatively, access information or maintenance information may be collected on-site by an appropriate transponder or other external device. The above-described LED 14 may be used to indicate to a person handling a transponder or a similar device outside the housing that (depending on the color of the emitted light) an authorization to access the room or cabinet protected by the electronic lock is authorized or not. As an alternative, the LED may be lit when access is granted or when the electronic lock has been released. The LED 14 may also be lit to indicate that a signal has been sent to the system via the antenna even without indicating whether or not access has been given. As can be seen in more detail in FIGS. 2 and 3, a gasket, such as an O-ring 44 shown in FIG. 1, may be provided between the base plate 38 and the cover 40 to prevent water spray from entering the housing 10 and/or to provide electrostatic-discharge protection.

As indicated above, spacer 18 shown in FIG. 1 is adapted to be accommodated in the groove 28 formed in the base plate 38 for specific applications of the transceiver housing unit shown in FIGS. 1 and 7. In particular, when the housing 10 is to be mounted to a flat mounting surface 90, i.e. when the groove 28 cannot cooperate with a raised strip 52 (see FIG. 6) of a mounting surface 90 to prevent rotation of the housing, an alternative rotation preventor may be employed. In the case of FIG. 1, a friction enhancing element, such as an O-ring 16 shown in FIG. 1 may be used to prevent rotation of the housing 10 relative to the mounting surface 90. For this purpose, the O-ring 16 may be present and clamped between the housing 10 and/or the spacer 18 and the mounting surface 90 as shown in more detail in FIG. 2. In particular, the housing 10 may have a portion 20 extending through the mounting surface 90. This portion 20 may have a thread which may interact with a fastener, such as a nut 32, to clamp the housing 10 to the mounting surface 90. Finally, FIG. 1 shows a washer 46 having at least one bent portion 58 which may prevent the nut 32 from being turned relative to the portion 20 which could lead to a loosening of the housing 10 from the mounting surface 90.

Figure 2:
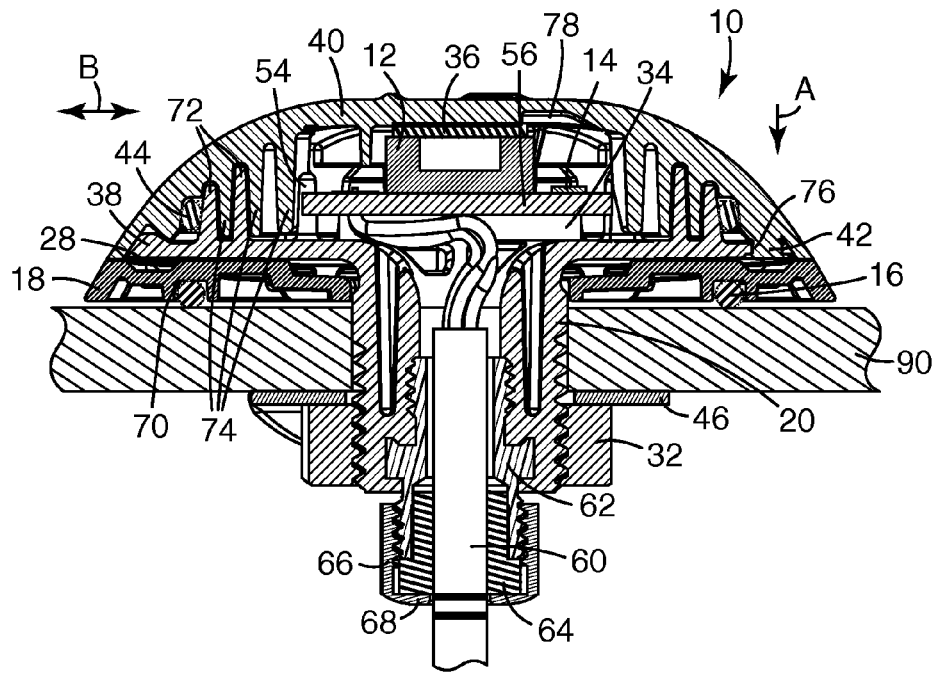
FIG. 2 shows a sectional view of the housing of FIG. 1 in the mounted state.

FIG. 2 is a sectional view of the housing of FIG. 1 attached to a mounting surface 90. In the mounted state, the mounting surface 90 is accommodated between the washer 46 and the friction enhancement O-ring 16. The nut 32 may have an internal thread which cooperates with an external thread of the portion 20 of the housing 10 which extends through the mounting surface 90. The nut 32 may be applied tightly to apply a pulling force between the washer 46 and the O-ring 16 which will be counteracted by the mounting surface 90 positioned in between so that the O-ring 16 will be clamped and may be deformed, thereby causing sufficient friction against rotation of the housing 10 relative to the mounting surface 90 to substantially prevent or at least hinder or retard rotation.

FIG. 2 additionally shows a cable 60 connected with printed circuit board 56. The cable 60 may lead to an electronic lock inside or behind a door or inside a cabinet protected by the lock or to other electronic components within the cabinet which are part of a security monitoring system. As can be seen in FIG. 2, the cable may be led through a guide 62 which may be present inside portion 20. The guide 62 may be of the same or a different material than portion 20 and may or may not be formed integrally with portion 20. A seal or gasket 64 may be present around the cable 60 and within the guide 62, and a seal nut 66 (that may have a portion 68 at least partially covering the seal 64 in a radial direction) may be screwed onto guide 62. This arrangement may clamp the gasket 64 in an axial direction and expand the gasket 64 in a radial direction to provide a reliable seal around cable 60.

FIG. 2 also shows the spacer 18 accommodated in the groove 28 of the base plate 38. The spacer 18 may have a groove 70 in which the friction enhancement O-ring 16 may be accommodated. FIG. 2 further shows pins 54 that may be used to provide coding for printed circuit boards 56 such that only a printed circuit board with a suitable coding contour on at least one of the edges thereof can be inserted. FIG. 2 also shows a damper 34 underneath the printed circuit board 56. The damper 34 may be provided in the form of one or more strips of damping material which may provide a vibration damping effect. A further damper 36 may be provided between the antenna 12 and the inside surface of the cover 40. The damper 36 may be provided in a circular or other suitable shape. In the case of a circular shape, it will generally correspond to the circular shape of the antenna 12 as shown for the embodiment of FIG. 1.

The inventive housing may be equipped with ESD protection to isolate internal electronic components from potentially damaging ESD events that may occur outside the housing. Isolation can be achieved by having the housing and sealing means of the housing made of isolating materials.

As shown in FIG. 2, the base plate 38 may have one or more annular or circular webs or ridges 72 which cooperate with one or more complementary ridges 74 formed on the cover 40 to form a maze. Such a maze may provide ESD (Electro Static Discharge)-protection as a spark that may be produced by a high voltage outside the housing will have to travel through the maze, i.e., up and down along the ridges 72, 74 to reach the electronic components such as the antenna 12 inside. Experiments show that this structure can prevent the electronic components inside from being affected by high voltages produced outside the housing.

In this context, the maze formed by ridges 72, 74 allows the use of conventional O-rings 44 containing graphite, which tends to be more durable than O-rings that do not contain graphite but which would otherwise not meet the criteria for an isolating sealing member. The durability of the sealing member is important because the housings may be employed on the outside of outdoor cabinets, e.g., cabinets located near streets or similar surroundings, where aggressive substances such as gasoline or oil may be present which may affect durability of the O-ring. As mentioned, this durability can be ensured by an O-ring containing graphite, and ESD-protection may be accomplished by the maze.

The maze formed by complementary ridges 72, 74 may, apart from electrostatic discharge protection, additionally provide protection against water spray. In particular, the housing can thus be protected based on standard IP 54 (spray) or IP 65 (hose-proof).

Finally, the ridges 72, 74 may be formed to be in tight contact with each other in the attached state of the cover 40 to provide additional mechanical stability to the housing.

FIG. 2 also shows a preferred type of connection between the base plate 38 and the cover 40. In this case, the base plate 38 has one or more openings 76, into which one or more protrusions 42 provided on the cover 40 may be inserted and deformed, e.g., by ultrasonic welding application of heat or pressure, etc., to provide an engagement between the base plate 38 and the cover 40. The interaction between the appropriately deformed protrusions 42 and the opening 76 can be called a rivet fastening.

As can be seen in FIG. 2, the O-ring 44 between the base plate 38 and the cover 40 may be held by a force acting in direction B between one of the ridges 72 formed on the base plate and an opposing ridge 74 formed on the cover 40. This direction B may be different than the direction in which the cover 40 is attached to the base plate 38 by inserting one or more protrusions 42, as shown FIG. 2, into one or more openings 76. This measure, i.e., the O-ring 44 being held by a force acting in a direction B different from the attachment direction A (which in the case shown is substantially perpendicular to direction B), may provide the advantage that the O-ring can be clamped without causing a reaction force of the O-ring tending to loosen the attachment or exerting a substantial force on the protrusions used to secure the cover to the base.

As can be seen in FIG. 2, two different materials can be used for the cover 40 to provide an integral lens or viewing window 78 to make the LED 14 visible from the outside. For this purpose, an inner part of the cover 40 that may include one or more ridges 74 and one or more protrusions 42 may be substantially transparent or having an opacity which allows the LED 14 to be viewed through it. An outer part of the cover 40 having a viewing window 78 filled with material of the inner part may be non-transparent or having a high opacity. Thus, from the outside, one can merely view the area underneath the viewing window 78 to find out whether the LED indicates an authorized access.

Specific positions of the protrusions 42 may be used to provide a type of coding between the base plate 38 and the cover 40. In other words, it may be ensured by specific positions of the protrusions 42 and corresponding positions of the through holes 76 that the base plate 38 and the cover 40 are attached to each other in a specific orientation. In particular, the above-mentioned plural coding systems may ensure that the LED 14 positioned on the printed circuit board 56 is reliably positioned underneath the viewing window 78 so that it can reliably be viewed from outside. This may be achieved by using one or more pins 54 provided on the base plate 38 to determine a specific position of the printed circuit board including the LED provided relative to the base plate 38. By the coding system related to the attachment of the cover 40 to the base plate 38 (i.e., the protrusions 42 and the through holes 76) a specific position of the cover including the viewing window 78 may be ensured to position the viewing window 78 above LED 14 to make the LED 14 visible from the outside, at least when it is emitting a light signal. The specific coding methods described above are provided for illustrative purposes. It will be understood that other coding methods may also be employed with equal effect, and therefore will also be encompassed within the scope of the invention. For example, coding can also be accomplished by choosing a particular shape of the pins 54 etc.

Figure 3:
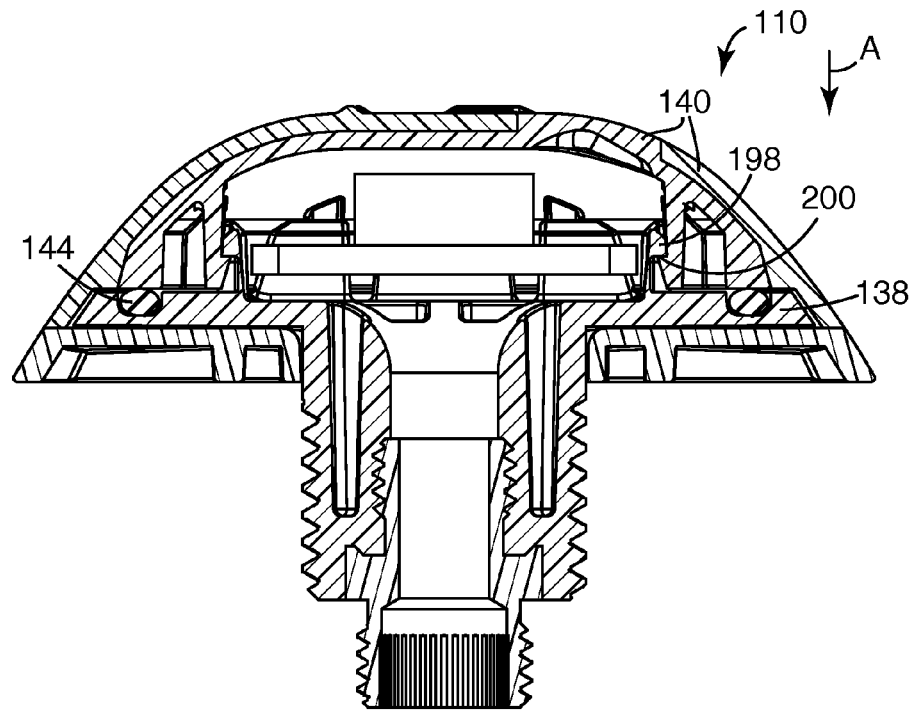
FIG. 3 shows a sectional view of a housing according to a further embodiment of the invention.

FIG. 3 shows a second embodiment of the housing 110 that is similar to the embodiment of FIG. 1 so that the explanations will focus on the differences vis-à-vis the embodiment of FIG. 1. In particular, in the embodiment of FIG. 3, the cover 140 is connected with the base plate 138 by one or more latch hooks 198. The base plate 138 may include one or more latch hooks 198 extending substantially in a direction towards the cover 140. To provide latch engagement, the latch hooks 198 have a hook-type end or a step having a locking surface 200 facing the base plate 138. The cover 140 may have one or more corresponding latch hooks having locking surfaces adapted to cooperate with the locking surfaces 200 of the latch hooks 198 of the base plate 138. Thus, when the cover 140 is attached to the base plate 138 by moving the cover in direction A, at least portions of the latch hooks will be slightly deformed, bent or displaced sideways to allow the complementary latch hook to pass. Due to elasticity of the latch hooks, they will return to their original position and shape after the corresponding latch hook has passed to bring the locking surface into engagement and preventing the cover from moving opposite to direction A which would remove the cover from the base plate. In the embodiment of FIG. 3, O-ring 144 may be clamped between the base plate 138 and the cover 140 by a force acting in direction A. However, the O-ring 144 may also be clamped in a direction different from direction A, as shown in FIG. 2, to avoid deterioration due to the clamping force acting on the latch hooks 198 securing the cover 140. The further details of the embodiment of FIG. 3 substantially correspond to those of the embodiment of FIG. 1 and do not need to be repeated here. As mentioned above, all of the above-described embodiments may be used together with a spacer 18. In the depicted embodiment, the cover 140 may comprise a translucent shell covered by a rugged plastic cover. Such a cover configuration can be made, for example, by insert molding, co-injection molding or the assembly of two separate parts to form the cover.

Figure 4:
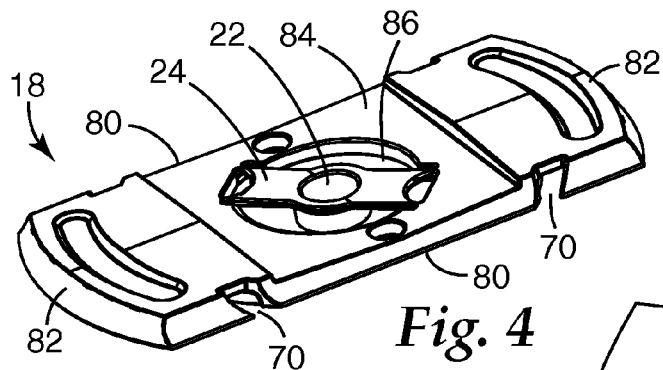
FIG. 4 shows a perspective view of a spacer of the housing shown in one of FIGS. 1-3 before mounting same.

FIG. 4 shows the spacer 18 in a perspective view. The spacer 18 substantially has the shape of a flat strip and may have two straight edges 80 corresponding to straight edges of the groove 28 that may be formed in the base plate 38. Corresponding to the round shape of the cover 40, the remaining edges 82 of the spacer may be rounded to fully conform to the edges of the cover 40 and provide the assembly of cover 40 and spacer 18 with a uniform, round edge. Moreover, corresponding to the dome-shaped form of the cover 40, 140, the rounded edges 82 of the spacer 18 may be inclined or somewhat curved along the thickness (as seen in direction A) of the spacer 18. FIG. 4 also shows the groove 70 provided in the spacer 18 for accommodating the friction enhancing O-ring 16.

Figure 5:
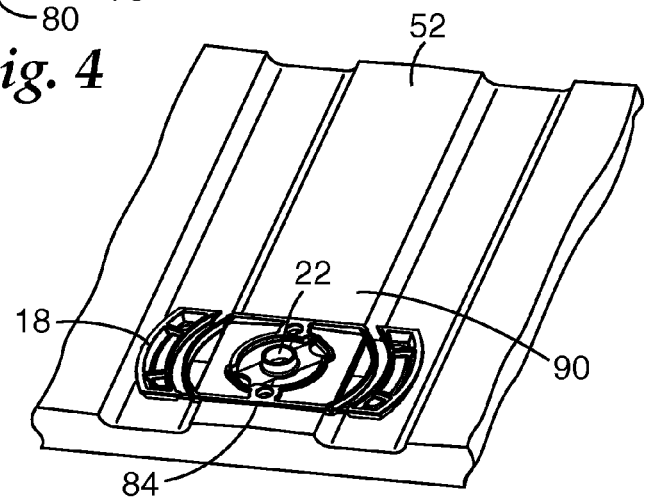
FIG. 5 shows a perspective view of the spacer of FIG. 4 used in connection with a profiled mounting surface.

In the embodiment of FIG. 4, the spacer 18 can also be used as a drilling template. As mentioned above, the housing 10 may be attached to an external mounting surface 90 of a telecommunication enclosure, such as a cabinet having one or more raised strips 52 on the external surface (see FIG. 6). In this case, a hole may be provided in the mounting surface 90 for allowing the portion 20 of the housing 10 to extend through the mounting surface 90. To ensure that the housing 10 is positioned appropriately, i.e., with steps 50 (see FIG. 1) accommodating the raised strip 52 (see FIG. 6), the spacer 18 may be used to define the proper drilling location. For this purpose, the spacer 18 may have a groove 84 that can be relatively wide and flat across one of the surfaces of the spacer 18. In particular, the groove 84 may correspond to the raised strip 52 of the mounting surface 90 so that the spacer can be positioned as shown in FIG. 5 with the groove 84 accommodating the raised strip 52. The spacer 18 may further have at least one hole 22 denoting a drilling location to allow the drilling of a hole in a location that allows the portion 20 of the housing 10 to pass through the hole formed in the mounting surface 90 and, at the same time, allow the positioning of the housing 10 relative to the raised strip 52, with the raised strip 52 accommodated between steps 50 (see FIG. 1) of the cover 40. It is noted that the raised strip 52 does not necessarily need to have the cross-sectional configuration with a flat top as shown in the figures. It may have any other cross-sectional configuration, such as a convex, curved shape, a roof-like shape, a concave top or any other configuration. It is apparent that the complementary contours formed on the housing can be adapted to the shape of the strip.

As can be further seen in FIG. 4, the hole 22 of the spacer may be formed on a removable portion 24 having the shape of an attached strip that is removable with respect to the remainder of the spacer 18. In the embodiment shown in FIG. 1, the spacer 18 may, firstly, be used as a drilling template as described above. As shown in FIG. 6, the housing 10 can in this case be attached to the mounting surface 90 without the spacer 18. Secondly, the spacer, as shown in FIG. 4, may be used as a spacer that is mounted to a mounting surface 90 together with the housing 10. In this case, the removable portion 24 is removed to allow the portion 20 of the housing to pass through the central hole 86 now formed in the spacer 18. Thus, with this combination of housing 10 and spacer 18, as shown in FIG. 4, a high versatility can be achieved, as the housing may be mounted to different types of mounting surfaces 90, i.e., with or without the raised strips 52.

As mentioned, FIG. 5 shows the use of the spacer 18 as a drilling template. As compared to the orientation of FIG. 4, the spacer 18 has been turned upside down with groove 84 accommodating the raised strip 52 formed on the mounting surfaces 90. The hole 22 denotes the location for drilling a hole through which the portion 20 (see FIG. 1) of the housing 10 extending through the mounting surface 90 can pass.

FIG. 6 shows the mounted state of the housing 10 with steps 50 and a groove formed in the housing defined by steps 50 accommodating the raised strip 52. By interaction between the steps 50 and the raised strip 52, rotation of the housing 10 relative to the mounting surface 90 is prevented.

FIG. 7 shows the housing 10 mounted to a substantially flat mounting surface 90. The embodiment shown in the mounted state in FIG. 7 may be used in combination with the spacer shown in FIG. 4. By this combination the housing including the spacer 18 presents a uniform and smooth surface without any substantial steps, gaps, edges or corners so that an engagement by tools that may be used to make an attempt to remove or destroy the housing is substantially prevented. Moreover, although it cannot be seen in FIG. 7, the friction enhancement O-ring 16 (see FIGS. 1-3) is clamped between the housing 10 and the mounting surface 90 and may provide sufficient friction to prevent the housing 10 from being rotated or twisted relative to the mounting surface 90.

FIG. 8 shows a perspective view of a telecommunications enclosure (e.g. a cabinet) employing an electronic lock according to another aspect of the invention. Telecommunication cabinet 300 may house several groups of telecommunications equipment, including (shown for illustrative purposes) a cross-connect field 318, a Digital Subscriber Line Access Multiplexer ("DSLAM") 320, one or more batteries 322 and various other common electronic modules 316 (such as, for example, a control unit, a test access matrix ("TAM"), a data storage unit, etc.). The interior of the cabinet 300 may be accessed by opening one of three exterior doors 310. At least one of the doors 310 is equipped with an electronic lock 312 which is electrically coupled with the transceiver housing unit or antenna assembly 314, which can have any of the configurations described above. It will be understood, however, that such a configuration may also be used where a mechanical lock is connected with the antenna. The antenna housing may be electrically connected to one or more of the electronic modules 316 such that the electronic lock may be activated and the antenna is capable of transmitting status and/or alarm information. Alternatively, the transceiver housing may be mounted to the exterior surface of any of the walls of the telecommunication enclosure.

FIG. 9 depicts one embodiment of a remote access monitoring application utilizing the antenna assemblies. Telecommunications cabinet 300, which may contain the electronic modules and equipment described above with respect to FIG. 8, is shown with doors 310 closed and antenna assembly 314 disposed on the exterior surface of one of the doors. In this embodiment the antenna may be coupled with sensors and/or any of the electronic modules contained within the cabinet and thereby may be capable of transmitting and/or receiving information related to the environment, contents or equipment performance within the cabinet. A technician holding a handheld communication device, reader or computer 330 can remotely access information related to the interior of the cabinet without opening the cabinet.

The communication device 330 for use with the current invention may include a central processing unit, an internal energy source (e.g. a battery), an antenna unit, user interface and a signal coder. The craftsman or technician can use the user interface to select the task or query to be performed on the closed enclosure 300. The signal coder can translate the task selection into a signal which will supply an electronic module within the enclosure with an appropriate direction. The signal may be transmitted by the antenna in the device 330 to a transceiver unit 314 mounted on the external surface of the enclosure 300. The task or query may be executed and an acknowledgement of completion or the queried information may be transmitted back to the remote communication device.

The task may be to monitor the environmental conditions and/or the performance of equipment housed in a closed cabinet or space. For example, the antenna may transmit information gathered from sensors located on or inside the cabinet or space related to the temperature, humidity, lighting, special orientation or other environmental conditions. Such a system may also transmit information related to equipment performance. In a particular telecommunications application, the antenna may be electrically connected to the telecommunications equipment within the cabinet or space. The craftsman may send a query or receive information related to line speeds, battery life, number of lines in use or other performance information of the telecommunication equipment in the enclosure. The antenna may also be connected to a test access matrix ("TAM") to allow for monitoring and diagnostic testing of telecommunications equipment through the remote communication device. The diagnostic tests include querying data transmission rates or line resistances of the telecommunication lines in the enclosure, identification and location bad lines or equipment, or monitoring of performance parameters of electronic equipment in the enclosure. Alternatively, the task may be a query to determine the contents of the enclosure or cabinet, number of free lines or information on customers and services supported by the cabinet.

One exemplary use of the monitoring system 400 described herein and with reference to FIG. 11, may provide an emergency wireless energy transfer to an electronic module 412 in a telecommunication enclosure or cabinet 410. The increasing use of electromechanical locks in telecommunication enclosures has introduced the need for emergency opening procedures in the event of a system failure within the enclosure. For example, if there is a loss of communication between the control unit 420 inside the cabinet 410 and the electronic locking module 412 or a loss of power feeding the enclosure via telecommunication line 430, it may not be possible to gain access to the enclosure using the normal opening procedure. If an emergency opening procedure has not been established, it may be necessary to destroy or damage some portion of the enclosure in order to gain access. This type of event can be very inconvenient and expensive.

In general, a portable energy store 446 (e.g. a capacitor, or small battery, etc.) may be provided in an electronic locking module 412 in an enclosure 410 to provide the necessary power to open the electronic lock 415. Generally, the energy store 446 has enough energy to enable several opening sequences within a few days of system failure. To save energy, in an alternative aspect the locking module may go into a sleep mode and may require that the module be woken up prior to initiating the opening sequence. If too much time has passed or the portable energy store has insufficient power to execute the opening sequence, it may be necessary to provide power to the energy store before commencing with an emergency opening procedure. For example, an AC energy signal and a coded signal may be sent from a remote communication device 330 to an electronic locking module 412 within a telecommunications cabinet 410 via an antenna mounted in the sealed transceiver unit 314 on the outside surface 413 of the cabinet 410 when the internal energy store is empty.

The coded signal provides transfer authorization to initiate the emergency opening procedure of the cabinet. The emergency opening procedure involves feeding power via the AC energy signal and waking up a microcontroller 448 in the locking module 412 via the coded signal. An advantage of this embodiment of the invention may be that both the powering of the locking mechanism and the subsequent opening of the cabinet may be performed via the transceiver mounted on the cabinet without requiring galvanic contact to the locking module to allow non-destructive entry into the cabinet in an emergency when the normal power supply has failed.

The communication device, as shown in FIG. 10, for use in this alternative embodiment of the current invention may include a user interface 348, an internal energy source 344 (e.g. an accumulator, a capacitor or a small battery), an antenna unit 346, a frequency generator unit 352, a signal coder 350 and a central processor 342. The craftsman or technician can use the user interface 348 to select the emergency open protocol. The central processor 342 can control the signal sequence for emergency opening procedure and the output level of the AC signal created by the frequency generator 352 which will be used to power the locking mechanism 415 in the enclosure 410. The coded signal created by the signal coder 350 and the AC power signal created by the frequency generator 352 may be transmitted by the antenna 346 in the communication device 330 and received by the antenna in the transceiver housing unit 314 mounted on the external surface 413 of enclosure 410. The signals may then be transmitted via hard wire connections to the locking module 412. The coded signal triggers the microcontroller 448 in locking module 412 to wake up and to prepare to receive the AC power signal needed to charge the energy store 446 in order to provide the necessary power to open lock 415.

The locking module 412 in this embodiment includes a power failure detector 440, a signal decoder 442, and an energy converter 444 in addition to standard components present in electronic locking module. The power failure detector 440 detects when a critical power failure occurs in the telecommunication enclosure and it sends a signal to a switch so that the antenna is connected directly to the electronic locking module. The detector may serve a secondary purpose of recognizing signal sent by the craftsman to initiate the emergency open protocol. The energy converter 444 is designed to gather the energy from the transmitted AC signal to fill up the storage device 446.

The locking module 412 can run self diagnostic tests during the powering operation to monitor when a sufficient amount of power has been transferred to the storage device. The locking module may send status information back to the communication device directing it to continue supplying the power or to discontinue the AC power signal. After the energy storage has reached a sufficient level in the locking module and the AC power signal has been discontinued, the communication device send a signal to the locking device to open the electronic lock 415 permitting access to the enclosure 410.

Alternatively, the remote monitoring system described herein allows a craftsman to perform status checks, gather information, initiate test protocols, download software to electronic equipment or modules within a telecommunications enclosure without the need for a direct hard wire connection or without gaining access to the interior of the enclosure. In addition, execution of the emergency opening protocol may be logged by the locking module when there is no link to the central office or when a data storage device is either off-line or not present.

For example, a remote communication device can send a signal to a transceiver located on the external surface of the enclosure. The transceiver may be electrically coupled to an electronic module inside of the enclosure. A signal from the communication device may be received by the transceiver and communicated to the electronic component. The signal may initiate an action such as opening an electronic lock, running a test protocol or having a sensor take a reading. Alternatively, the signal may query an electronic module such as a data storage device for information. The electronic module within the enclosure may send the requested information, test data, sensor reading or a confirmation that a requested action has been completed back through the transceiver to be received by the communication device. In another exemplary embodiment of the monitoring system of the present invention, a craftsman can send a signal requesting access or network status information for a particular node in a telecommunication network to a transceiver located on an external surface of a telecommunication enclosure. The signal can be transmitted to a centralized monitoring location such as a central office or regional monitoring station using an installed network management and/or security system. The regional monitoring office can then provide specific access or performance information back to the craftsman though the management system to the local enclosure which is then communicated to the craftsman via a remote communication device. Utilization of the remote monitoring system allows centralized monitoring of maintenance for network nodes as well as instantaneous system performance relating to a specific node on the network. This remote monitoring approach can eliminate the need for the technician to use a secondary communication method such as a cellular telephone or separate radio system or a hardwire connection with a handset in order to communicate with the central office or regional monitoring station.

In an alternate embodiment, the invention provides a method of querying a closed telecommunications enclosure. A signal may be sent from a remote communication device to an electronic module within the enclosure through a transceiver located in a sealed housing on an external surface of the enclosure. The signal may include a software upload or direction to perform a task. The task may include performing a data query of information within the electronic module, providing emergency power to open an electronic lock or instructing the electronic module to perform an action. The actions may include directing an electronic sensor to take a reading, having the test matrix initiate a test protocol, shutting off an electronic alarm, or opening an electronic door lock. The electronic module performs the requested task and sends an acknowledgement signal or a report back to the communication device via the transceiver. The acknowledgment report may take the form of the queried information, or a verification signal, such as a message shown by the used interface of the remote communication device, an audible tone emitted by the communication device, or a visual signal such as the illuminating of a light on the communication device.

This transceiver unit structure may be particularly advantageous when the telecommunication enclosure provides electromagnetic interference (EMI) protection to the electronic modules contained within the enclosure. In recent years, telecommunication equipment has advanced. In particular, phone systems have evolved to provide significantly higher line density. In order to provide adequate voice and data systems to their urban customers, local access providers and Incumbent Local Exchanger Carriers (ILEC) may need to upgrade the equipment in existing local telecommunications enclosures or install new enclosures with state of the art equipment, including, but not limited to, Digital Loop Carrier (DLC), and Digital Subscriber Line systems (xDSL). The new equipment has greater line density and requires more power, cooling and space than existing cabinets can provide. The new equipment also emits significantly more electromagnetic radiation than older equipment and may violate United States Federal Communications Commission (FCC) regulations or other international electromagnetic emission regulations on EMI emissions if non-EMI shielded enclosures are used. Additionally, electromagnetic interference may impact the performance of the electronic equipment in the enclosure or may lead to issues with cross talk in high density systems.

Generally, EMI protection is provided by using either an EMI reflecting or EMI absorbing material in the design of the enclosure. A simple example of using an EMI reflective material would include making the enclosure out of a metal (such as steel or aluminum) or using a metallic coating on either the inside or outside surface of the enclosure. EMI absorbing materials may be composite materials having an insulating continuous phase (e.g. a plastic, foam or elastomer) and a conductive dispersed phase such as carbon black, metallic flakes or particles, or a combination thereof. Alternatively, an EMI shielding fabric may be used. EMI absorbers may be used as insulation for a portion of the enclosure, particularly the portion of the enclosure surrounding the electronic modules and equipment contained in the enclosure. When an enclosure has EMI shielding it may be necessary to provide a transceiver outside of the enclosure if remote communication with the electronics inside of the enclosure is desired.

The present invention has now been described with reference to several individual embodiments. The foregoing detailed description has been given for clarity of understanding only. No unnecessary limitations are to be understood or taken from it. All references to right, left, front, rear, up and down as well as references to directions are exemplary only and do not limit the claimed invention. It will be apparent to those persons skilled in the art that many changes can be made in the embodiments described without departing from the scope of the invention. Thus, the scope of the present invention should not be limited to the details and structures described herein, but rather by the structures described by the language of the claims, and the equivalents of those structures.

The invention claimed is:

1. A remote telecommunication monitoring system comprising:
   a telecommunication enclosure including an exterior surface;
   a transceiver disposed in a sealed housing wherein the sealed housing is flush mounted to the exterior surface of the enclosure and wherein a portion of the sealed housing extends through the exterior surface an interior portion of the telecommunication enclosure;
   an electronic module contained within the interior portion of the enclosure and electrically connected to the transceiver, wherein the electronic module is selected from the group consisting of an electronic lock, a data storage device, a memory device, telecommunication equipment, meteorological equipment, a test access matrix, an electronic alarm, a control unit, and an electronic sensor; and
   a remote communications device that sends signals to and receives signals from the transceiver.

2. The monitoring system of claim 1, wherein the enclosure provides electromagnetic shielding protection.

3. The monitoring system of claim 1, wherein the remote communications device is selected from the group consisting of a handheld device, a transponder, and a networked computer.

4. The monitoring system of claim 1, wherein the remote communications device sends and receives radio frequency signals.

5. The monitoring system of claim 1, wherein the remote communications device sends and receives optical signals.

6. The monitoring system of claim 1, wherein the telecommunications enclosure is selected from the group consisting of a closure, a terminal, a cabinet, a vault, a manhole, a storage location, and an equipment room.

7. The monitoring system of claim 1, wherein the transceiver includes at least one of a radio frequency antenna, a photoelectric cell and a light sensor.

8. The monitoring system of claim 1, wherein the electronic module is an electronic sensor and wherein the signal received by the transceiver instructs the electronic sensor to take a reading of local environmental conditions and send the information back to the remote communications device.

9. The monitoring system of claim 1, wherein the electronic module is a data storage device and wherein the signal received by the transceiver instructs the data storage device to send queried information to the remote communications device.

10. The monitoring system of claim 9, wherein the queried information comprises at least one of an inventory of components contained within the enclosure, an access log for the enclosure, installation and maintenance records of equipment in enclosure, a list of customers and services supplied by the equipment in the enclosure, and alarm information for the enclosure.

11. The monitoring system of claim 1, wherein the electronic module is a test access matrix and wherein the signal received by the transceiver instructs the test access matrix device to perform diagnostic tests and to send test results to the remote communications device.

12. The monitoring system of claim 11, wherein the diagnostic tests comprise measuring data transmission rates of the telecommunication lines in the enclosure, identifying and locating bad lines or equipment, or monitoring of performance parameters of electronic equipment in the enclosure.

13. The monitoring system of claim 1, wherein the telecommunication equipment in the enclosure comprises a remote switching module, a Digital Subscriber Loop Access Multiplexers, or a Video Ready Access Device.

14. A method of querying a telecommunication enclosure comprising:
   providing a transceiver mounted in a sealed housing wherein a portion of the sealed housing extends through an exterior mounting surface of the telecommunication enclosure and wherein the housing is flush-mounted on the exterior surface of the enclosure;
   sending a signal from a communications device to an electronic module though the transceiver to initiate a task within the enclosure;
   performing the task;
   logging the receiving of the signal by the electronic component and a completion status of the task; and
   sending an acknowledgement report from the electronic module to the remote communication device.

15. The method of claim 14, further comprising retrieving information from a memory device.

16. The method of claim 14, wherein the task comprises running an emergency open protocol comprising waking an electronic lock module from sleep mode; powering an energy storage device; and releasing an electronic lock to open the enclosure.

17. The method of claim 14, wherein the electronic module includes a control unit and wherein the signal directs the control unit to send instructions to a secondary electronic module in the enclosure to perform a task.

18. The method of claim 14, wherein the task is at least one of opening an electronic lock, executing a sensor reading and shutting off an alarm.

* * * * *